(12) United States Patent
Pang et al.

(10) Patent No.: US 7,205,548 B2
(45) Date of Patent: Apr. 17, 2007

(54) HIGH QUANTUM EFFICIENCY X-RAY DETECTOR FOR PORTAL IMAGING

(75) Inventors: Geordi Gendi Pang, Markham (CA); John Alan Rowlands, Toronto (CA)

(73) Assignee: Sunnybrook Health Sciences Centre, Toronto (CA)

( * ) Notice: Subject to any disclaimer, the term of this patent is extended or adjusted under 35 U.S.C. 154(b) by 0 days.

(21) Appl. No.: 11/340,710

(22) Filed: Jan. 27, 2006

(65) Prior Publication Data

US 2006/0131512 A1  Jun. 22, 2006

Related U.S. Application Data

(62) Division of application No. 10/679,512, filed on Oct. 7, 2003, now Pat. No. 7,030,386.

(60) Provisional application No. 60/416,229, filed on Oct. 7, 2002.

(51) Int. Cl.
*G01T 1/24* (2006.01)

(52) U.S. Cl. .............................. 250/370.14; 250/370.09

(58) Field of Classification Search ........... 250/370.14, 250/370.09
See application file for complete search history.

(56) References Cited

U.S. PATENT DOCUMENTS

| | | | | |
|---|---|---|---|---|
| 4,937,453 A | * | 6/1990 | Nelson | 250/370.09 |
| 5,010,252 A | * | 4/1991 | Steele | 250/385.1 |
| 5,434,417 A | * | 7/1995 | Nygren | 250/370.01 |
| 5,731,584 A | * | 3/1998 | Beyne et al. | 250/374 |

(Continued)

OTHER PUBLICATIONS

L.E. Antonuk, "Electronic portal imaging devices: a review and historical perspective of contemporary technologies and research", Phys. Med. Biol. 47 (2002), pp. R31-R65.

(Continued)

*Primary Examiner*—David Porta
*Assistant Examiner*—Christine Sung
(74) *Attorney, Agent, or Firm*—Lynn C. Schumacher; Hill & Schumacher

(57) ABSTRACT

The present invention provides a practical design of a megavoltage x-ray detector with both high quantum efficiency (QE) and high resolution. The x-ray detector disclosed herein has a QE that can be an order of magnitude higher than that of current flat panel systems and yet has a spatial resolution equivalent to that of current flat panel systems used for portal imaging. The x-ray detector includes a large number of micro-structured electrically conducting plates, packed together with thin spacers placed between neighboring plates with the micro-structured plates oriented to be parallel to the incident x-rays in operation. Each plate includes an electrically conductive substrate with a first planar surface, elongate electrically conductive strip electrodes separated from each other with strip spacers placed in between and sitting on an insulating layer interposed between the first planar surface of the electrically conductive substrate and the strip electrodes. A power supply applies a bias voltage between each electrically conductive substrate and the electrically conductive strip electrodes, whereby x-rays absorbed in the conductive substrate generates high energy electrons which produce ions in an ionization medium located in spaces between the conductive substrate and the electrically conductive strips. A detector detects an electrical current generated in the electrically conductive strip electrodes and a 2D active readout matrix is coupled to the detector.

6 Claims, 5 Drawing Sheets

U.S. PATENT DOCUMENTS 6,207,958 B1 * 3/2001 Giakos .................. 250/385.1
6,476,397 B1 * 11/2002 Francke ................. 250/385.1
6,559,453 B2 * 5/2003 Lundqvist ................ 250/371
6,586,742 B2 * 7/2003 Danielsson ........... 250/370.01

OTHER PUBLICATIONS

J. L. Gerstenmayer, "Improving spatial resolution of high stopping power X- and gamma-ray cameras: fibers or flat-structured detectors?". Nuclear Instruments and Methods in Physics Research A, 454 (2000), pp. 232-240.

M. A. Mosleh-Shirazi et al., "Rapid portal imaging with a high-efficiency, large field of view detector", Med. Phys., 25 (12), Dec. 1998, pp. 2333-2346.

A. Sawant et al., "Theoretical analysis and experimental evaluation of a CsI(TI) based electronic portal imaging system", Med. Phys., 29 (6), Jun. 2002, pp. 1042-1053.

J. Ostling et al., "Novel detector for portal imaging in radiating therapy", Proceedings of SPIE vol. 3977 (2000), pp. 84-95.

R. Hinderer et al., "Development of a New Multielement Detector System for Megavoltage Photons", Proceedings SPIE, vol. 4682 (2002), pp. 809-818.

E. Christophel et al., "The micro-gap wire chamber", Nuclear Instruments and Methods in Physics Research A 398 (1997), pp. 195-202.

D.L. Langer et al., "Intrinsic spatial resoultuon in a flat panel imager as a function of Quantum Efficiency for megavoltage x-rays", Presentation at EP12K2 conference, Vancouver BC. Jun. 2002.

Beuville, E. et al. "An efficient digital x-ray imaging system with high spatial resolution and robust energy sensitivity" 1995 IEEE nuclear science symposium and medical imaging conference record, San Francisco, Oct. 21-28, 1995. vol. 3, pp. 1602-1606.

Dixit, M.S. et al. "Development of gas microstrip detectors for digital x-ray imaging and radiation dosimetry", IMTC/97 IEEE Instrumentation/Measurement technology conference, Ottawa, May 19-21, 1997, vol. 2, Conf. 14, pp. 1357-1360.

Hayakawa, Y. et al., "Microstrip Gas Chamber for x-rays and neutrons", Japanese journal of applied physics, Publication Office Japanese Journal of Applied Physics. Tokyo, JP. Vo. 35, Part 2, No. 1B, Jan. 15, 1996, pp. L123-L125.

* cited by examiner

AN INDIVIDUAL PLATE

CROSS SECTION OF THE PLATE IN FIG. 3a

HIGH QUANTUM EFFICIENCY X-RAY DETECTOR FOR PORTAL IMAGING

CROSS REFERENCE TO RELATED U.S. PATENT APPLICATION

This patent application is a Divisional application of U.S. patent application Ser. No. 10/679,512 entitled "HIGH QUANTUM EFFICIENCY X-RAY DETECTOR FOR PORTAL IMAGING" filed on Oct. 7, 2003 now U.S. Pat. No. 7,030,386 in the name of the same inventors which claims the benefit of, U.S. provisional patent application Ser. No. 60/416,229 filed on Oct. 7, 2002, entitled HIGH QUANTUM EFFICIENCY X-RAY DETECTOR FOR PORTAL IMAGING, which is incorporated herein in its entirety.

FIELD OF THE INVENTION

This invention relates generally to improved electronic portal imaging devices (EPIDs) used in radiation therapy, and more particularly the present invention relates to high quantum efficiency (QE) x-ray detectors for portal imaging applications including megavoltage cone beam computed tomography (MVCT).

BACKGROUND OF THE INVENTION

Recently developed flat panel detectors have been proven to have a much better image quality than conventional electronic portal imaging devices (EPIDs) [see, for example, G. Pang, D. L. Lee, and J. A. Rowlands, "Investigation of direct conversion flat panel imager for portal imaging", Med. Phys., 28, 2121–2128 (2001)]. They are, however, not yet ideal systems for portal imaging application (using megavoltage x-rays) due to the low x-ray absorption, i.e., low quantum efficiency (QE), which is typically on the order of 2–4% as compared to the theoretical limit of 100%. The low QE is due to the fact that the total effective thickness (also referred to as the x-ray path length) of these detectors is only ~2 mm while the first half value layer (HVL) for, e.g., 6MV x-ray beam is ~13 mm of lead. A significant increase of QE is desirable for applications such as a megavoltage cone-beam computed tomography (MVCT) and megavoltage fluoroscopy. However, the spatial resolution of an imaging system usually decreases significantly with the increase of QE. The key to the success in the design of a high QE detector is, therefore, to maintain the spatial resolution. Recently, we demonstrated theoretically that it is possible to design a portal imaging detector with both high QE and high resolution [see G. Pang and J. A. Rowlands, "Development of high quantum efficiency flat panel detector: Intrinsic spatial resolution", Med. Phys. (In press, 2002)]. However, how to design a practical detector of this kind remained open.

Therefore, it would be very advantageous to provide an x-ray detector with both the quantum efficiency and spatial resolution that can be used for portal imaging applications including megavoltage cone beam computed tomography (MVCT).

SUMMARY OF THE INVENTION

An objective of the present invention is to provide a practical design of a megavoltage x-ray detector with both high QE and high resolution. In accordance with the present invention, the x-ray detector disclosed herein has a QE that can be an order of magnitude higher than that of current flat panel systems and yet has a spatial resolution equivalent to that of current flat panel systems used for portal imaging.

The present invention provides an x-ray detector, comprising:

at least one detector element including an electrically conductive plate substrate with a first planar surface and an upper edge and lower edge, at least two electrically conductive elongate strip electrodes spaced from each other and each electrically conductive elongate strip electrode being mounted on an insulator interposed between the electrically conductive elongate strip electrode and the first planar surface of the electrically conductive plate substrate;

the electrically conductive plate substrate being made of a high density metal and the at least one detector element being oriented with respect to a source of x-rays so that the electrically conductive plate substrate is aligned in a direction of a flux of incident x-rays in order for x-rays entering the upper edge of the electrically conductive plate substrate to travel through a length of the electrically conductive plate substrate thereby increasing the probability of absorption of the x-rays by the electrically conductive plate substrate;

power supply for applying a bias voltage between each electrically conductive plate substrate and the electrically conductive strip electrodes; and detection means for detecting an electrical current generated by displacement of electrical charges produced in an ionization medium located in spaces between the electrically conductive plate substrate and the electrically conductive elongate strip electrodes, which in turn are produced by high energy electrons which are generated by x-rays absorbed in the electrically conductive plate substrate.

BRIEF DESCRIPTION OF THE DRAWINGS

Preferred embodiments of the invention will now be described, by way of example only, with reference to the drawings, in which:

FIG. 3b is a cross section of the detector element shown in FIG. 3a;

DETAILED DESCRIPTION OF THE INVENTION

Figure 1:
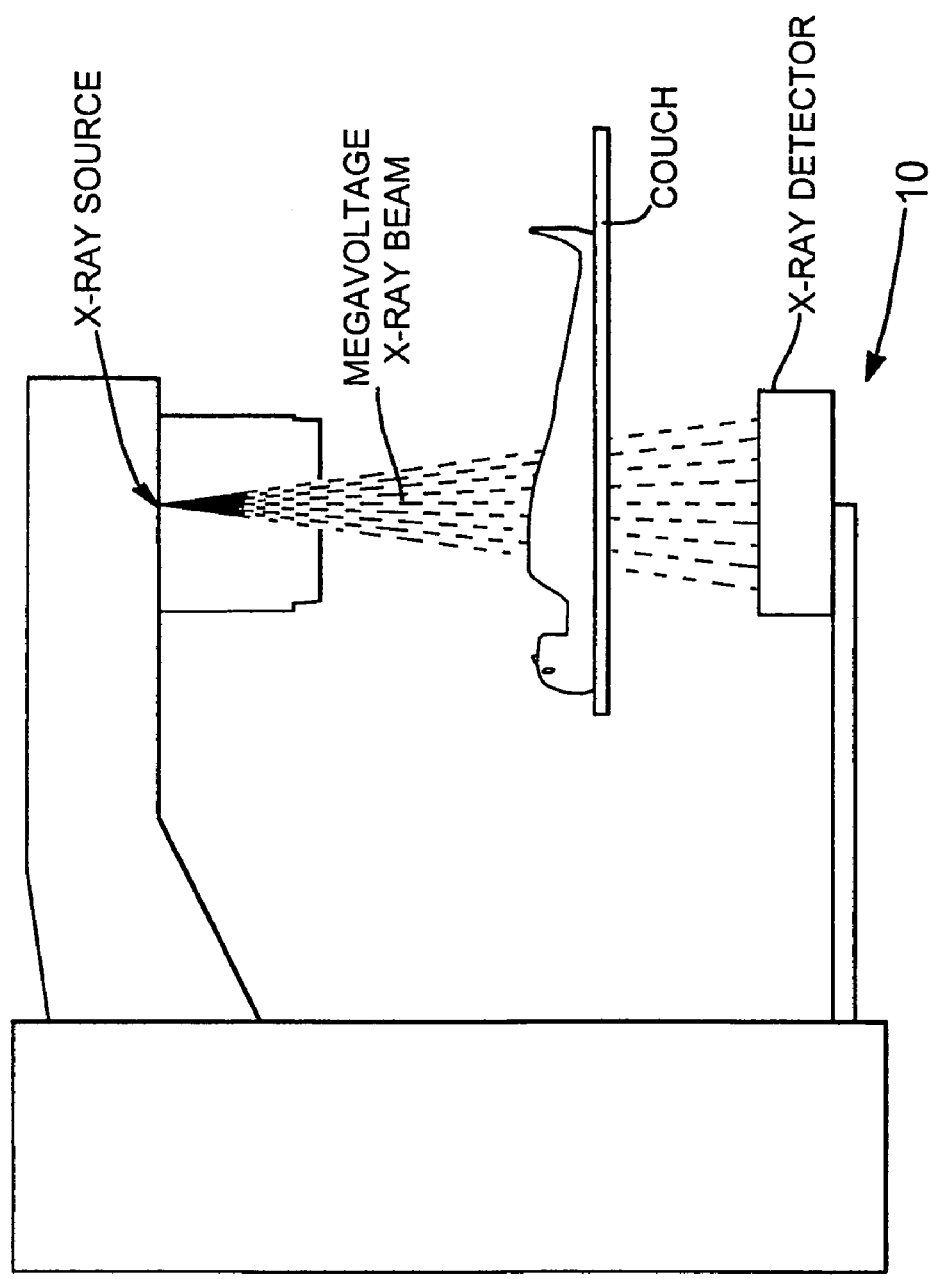
FIG. 1 shows an example of the use of the present invention where the x-ray detector is mounted on the gantry of a linear accelerator (Linac) used in radiotherapy to treat patients with tumors. The x-ray detector is used to take either x-ray projection or MVCT images of a patient to verify the positioning of the patient or to locate the tumor target either prior to or during the treatment.

Referring to FIG. 1, an objective of the present invention is to provide a practical design of a megavoltage x-ray detector with both high QE and high resolution to replace current low QE x-ray detectors used in radiotherapy. The x-ray beam emitted from a linear accelerator (Linac) is of high energies and typically ranges from 1MV to 25MV. The x-ray beam is typically of cone shape. The maximum size of the x-ray beam (also referred to as the field size) at the distance 100 cm away from the x-ray source is typically 40 cm×40 cm. The distance from the detector to the x-ray source can be variable and typically range from about 100 cm to about 240 cm. Thus, to image the whole x-ray beam, an area detector with a large field of view (from ~40 cm×40 cm up to ~100 cm×100 cm) is preferred. The size of the detector, however, depends on the end applications and could be small if it is used in a laboratory for, e.g., imaging small animals and larger for imaging humans as shown in FIG. 1.

Figure 2:
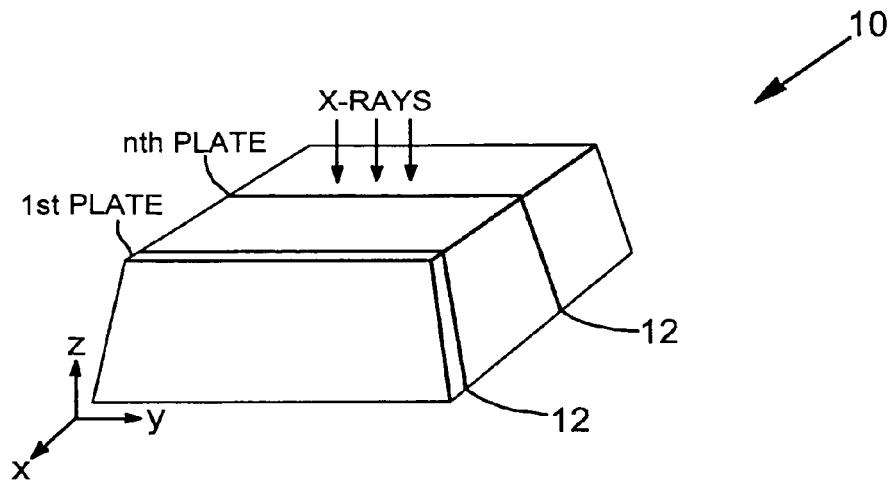
FIG. 2 shows a perspective view of a high QE x-ray detector constructed in accordance with the present invention comprised of a large number of micro-structured plates (also referred to as detector elements), packed together with thin spacers placed between neighboring plates with the micro-structured plates oriented to be parallel to the incident x-rays in operation.

Referring to FIG. 2, a new x-ray detector shown generally at 10 constructed in accordance to the present invention comprises a number (e.g. 2-100,000) of individual micro-structured detector plates (also referred to as detector elements) 12 (each with thickness of typically ~0.01–10.0 millimeters), packed together as shown in FIG. 2. In operation these micro-structured detector plates or detector elements 12 are oriented so that they are parallel to the incident x-rays being detected and provides a large area (with a field of view of, e.g., ~40 cm×40 cm or larger) and thick (~a few centimeter to a few tens centimeter thick, depending on QE) x-ray detector.

Figure 3A:
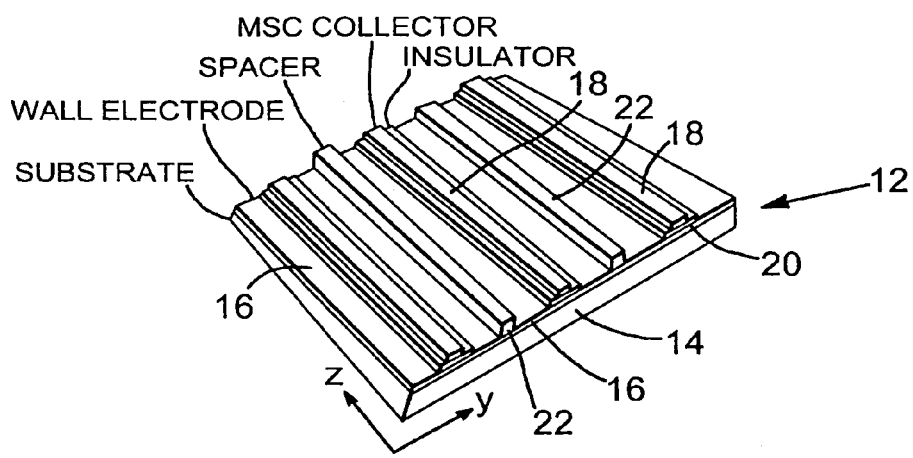
FIG. 3a is a perspective view of an individual plate or an individual detector element made by, e.g., photolithographic patterning of evaporated or electroplated layers in which the micro-strip charge (MSC) collectors (also referred to as electrically conductive elongate strip electrodes) are focused towards the x-ray source. In operation, an electric voltage is applied between the MSC collectors and the wall electrode (or the metal substrate that is electrically in good contact with the wall electrode), and charges generated by x-rays are collected by the MSC collectors.
Figure 3B:
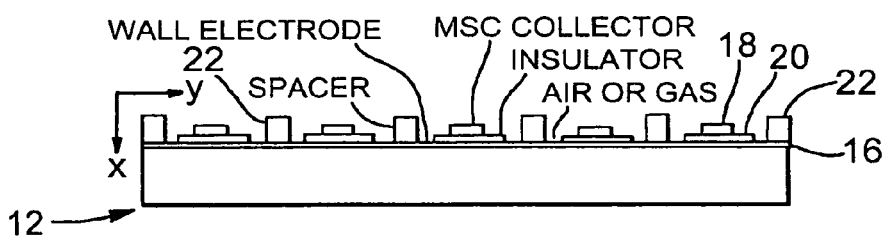

FIGS. 3a and 3b show respectively a perspective and cross sectional view of an individual plate or an individual detector element 12 made by, e.g. photolithographic patterning of evaporated or electroplated layers. Each micro-structured detector element 12 is comprised of an electrically conducting plate substrate 14 (preferably made of a high-density metal material, such as, but not limited to, W, Cu, Ta, Pb and steel) covered by a thin layer of microstructures, which can be made by, e.g., photolithographic patterning of evaporated or electroplated layers. As shown in FIGS. 3a and 3b, the microstructures comprise a thin sheet electrode 16 (also referred to as a wall electrode), micro metal strips (or wires) 18 with an insulator strip 20 (e.g., polyimide) underneath each metal strip 18, and micro-strip spacers 22 (also referred to as conductive elongate strip spacers) placed between neighboring micro metal strips 18. The micro metal strips 18 or wires are used as the charge collecting electrodes (also referred to as micro-strip charge (MSC) collectors or electrically conductive elongate strip electrodes). The MSC collectors 18 (also referred to as electrically conductive elongate strip electrodes) are focused towards the x-ray source when the detector elements are assembled. The distance between two neighboring MSC collectors 18 is typically ~0.01–10.0 millimeters. The micro-strip spacers 22 are used for several purposes, the first being to prevent the MSC collectors 18 from touching the corresponding substrate 14 of the neighboring detector plate 12.

The spacers 22 are preferably conductive, elongate strip spacers, one located between each elongate conductive strip electrode 18 so that they are also aligned in the direction of the flux of x-rays incident on a given detector element. The conductive elongate strip spacers 22 are preferably made of a high density metal whereby x-rays absorbed therein generate high energy electrons which produce electrical charges in the ionization medium while simultaneously blocking high energy electrons exiting the electrically conductive plate substrate in the transverse direction to the direction of the flux of incident x-rays in order to improve the spatial resolution of the x-ray detector in the transverse direction and the quantum efficiency of the detector. In operation, an electric voltage is applied between the MSC collectors 18 and the wall electrode 16 (or the metal substrate 14 that is electrically in good contact with the wall electrode), and charges generated by x-rays are collected by the MSC collectors 18.

Figure 6:
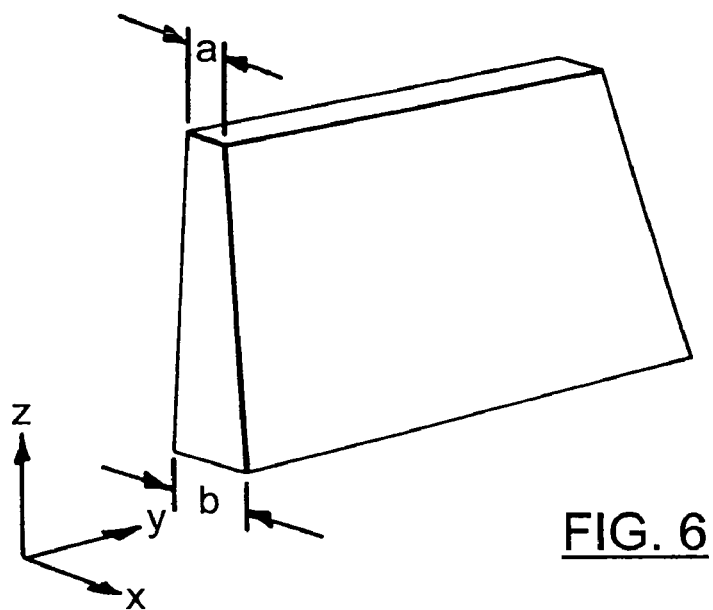
FIG. 6 shows a perspective view of an individual tapered substrate.

These spacers 22 can be metal (and formed by, e.g., electroplating) and connected to the wall electrode 16 (i.e., as a part of wall electrode). When the detector unit 10 is sealed with a selected number of micro-structured detector plates or detector elements 12 contained therein the space between the wall electrode 16 and MSC collector electrodes 18 is filled with a medium which can be ionized such as a fluid, for example an ionizable liquid, an ionizable solid or preferably an ionizable (compressed or non-compressed) gas (e.g., xenon) or air. In order to reduce the blurring due to oblique incidence of off-axis x-rays, the MSC collectors 18 should be focused towards the x-ray source. This can be achieved by properly arranging the orientation of the collectors 18 on each plate as well as using tapered substrates (see FIGS. 3 and 6).

The electrically conductive plate substrate 14 being made of a high density metal and the detector element(s) being oriented with respect to a source of x-rays so that the electrically conductive plate substrate is aligned in the direction of the flux of incident x-rays in order for x-rays entering the upper edge of the electrically conductive plate substrate to travel through the length of the electrically conductive plate substrate thereby increasing the probability of absorption of the x-rays by the electrically conductive plate substrate.

While for most x-ray detector applications it will be advantageous to have a large number of detector elements 12, it will be appreciated that a detector may be made using the present invention which uses only one detector element 12. For example, in the case of megavoltage fan-beam CT where the kilovoltage x-ray source in a conventional CT scanner is replaced by a megavoltage x-ray source, an x-ray detector array with a single detector element would be adequate. Another example is associated with dosimetry application where a detector array with one detector element could be used as a tool to measure x-ray dose profiles.

In operation, an electric potential is applied across the MSC collector electrodes 18 and the wall electrodes 16 (e.g. the collectors 18 are virtually grounded and the wall electrodes 16 are biased with a negative or a positive voltage, which can be anywhere from a few volts to a few hundred volts). Megavoltage x-rays interacting with the detector 10, mainly in the denser substrates 14 and spacers 22 generate fast electrons, which in turn produce ions (also referred to as electrical charges) in the air or other gas present. These ions are then guided by the applied electric field and collected by the MSC collectors 18. If there is an object or patient placed between the x-ray source and the detector 10 as shown in FIG. 1, the distribution of the charges collected by MSC collectors 18 represents an x-ray image of the object. These charges can be readout by different ways, e.g., by a 2D active matrix either continuously (fluoroscopic mode) or discontinuously (radiographic mode). Once readout, the image can be processed and used, depending on applications.

Figure 4:
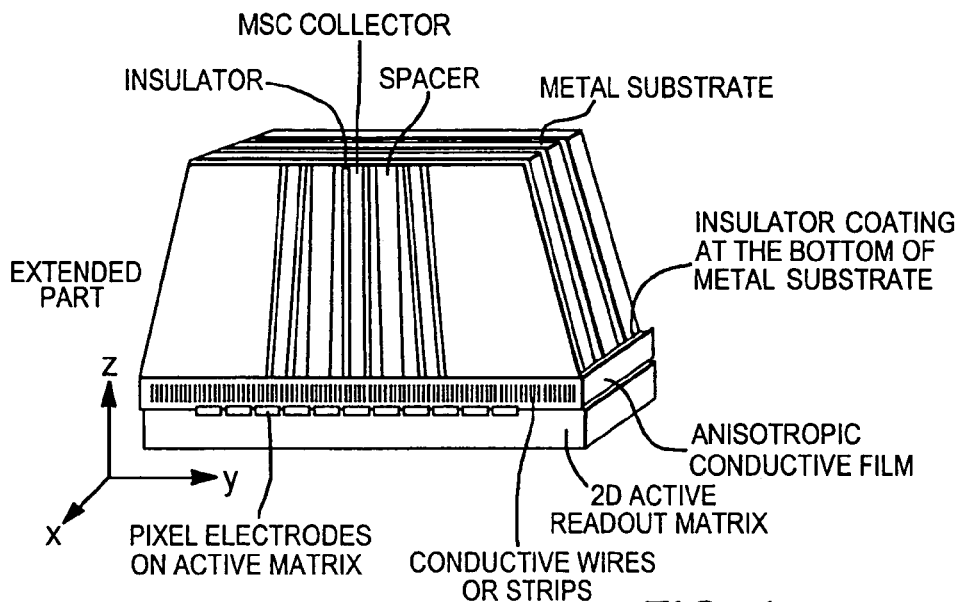
FIG. 4 is a perspective view showing a first embodiment of a configuration of the detector for reading out charges collected by the MSC collectors in which the detector shown in FIG. 2 is placed on a 2D active readout matrix with a good contact between the MSC collectors and the pixel electrodes of the active matrix achieved by first extending the MSC collectors over the substrate and then inserting a thin layer of anisotropic conductive adhesive film or elastomer film between the detector and the 2-D active matrix (the insulator coating at the bottom of the metal substrates is to prevent the substrates from being electrically connected to the active matrix)

The ions or charges collected by MSC collectors 18 can be readout using different methods. One method is to use a 2D active readout matrix similar to that used in current flat panel technology [see, for example, G. Pang, D. L. Lee, and J. A. Rowlands, "Investigation of direct conversion flat panel imager for portal imaging", Med. Phys., 28, 2121–2128 (2001)] or a flexible 2D active matrix used, e.g., in flexible liquid crystal display. In this case, the detector is placed on the 2-D active matrix with a good contact between the MSC collectors and the pixel electrodes of the active matrix (but the wall electrodes as well as the substrates and spacers should be insulated from the active matrix). Referring to FIG. 4, this can be achieved by, e.g. first extending the MSC collectors over the edge of the substrate by, e.g., 0.001–10.0 millimeters (using for example electroplating) and then inserting a thin layer of anisotropic conductive elastomer film (e.g., Shin-Etsu's MT-type inter-connector) or anisotropic conductive adhesive film (e.g., 3M Z-axis adhesive film) [see, e.g. K. Ishibashi and J. Kimura, AMP journal of Technology, vol. 5, 24–30 (1996)] between the detector and the 2-D active matrix as illustrated in FIG. 4.

Figure 5:
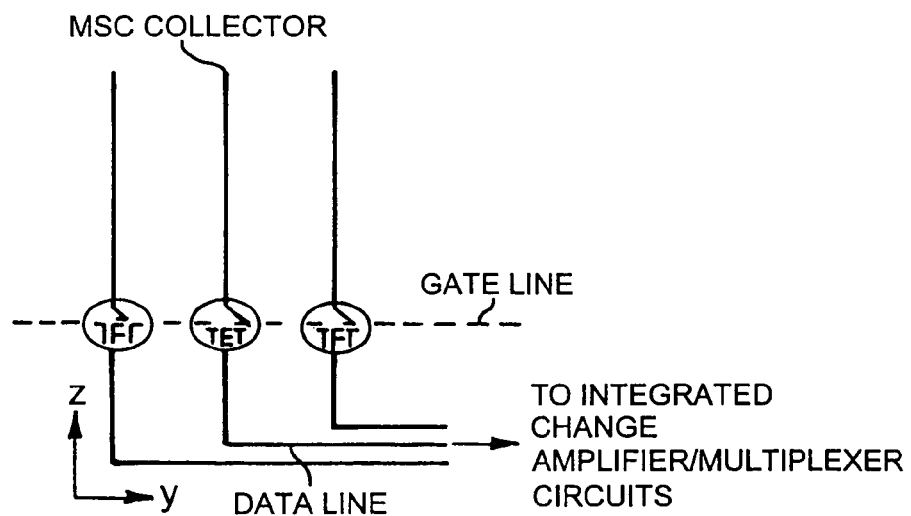
FIG. 5 is a schematic of an alternative embodiment of a configuration of the detector for reading out the charges collected by the MSC collectors in which each MSC collector is linked to a data line with a thin-film-tansistor (TFT), for each plate, there is one common gate line to turn on/off all TFTs on the same plate and by turning on the TFTs, one plate at a time, charges on the collectors can be scanned and readout.

Referring to FIG. 5, another embodiment of the x-ray detector involves building a thin-film-transistor (TFT) structure directly on each substrate plate 14. For each MSC collector 18, there is a TFT that connects the collector electrode 18 to a data line when the TFT is in the "on" position. Different MSC collectors 18 of the same plate have different data lines. MSC collectors 18 of different plates 14 that have the same X coordinates (see FIG. 2 for definition of coordinates where the x-ray flux is in the Z-direction) are connected to a common data line (i.e. the total number of data lines in the whole detector equals the total number of MSC collectors 18 on a single plate). All data lines are, in turn, connected to integrated charge amplifier/multiplexer circuits. For each plate 14, there is one common gate line which turns on/off all the TFTs on the same plate. By turning on the TFTs, one plate at a time, charges collected on the MSC collectors 18 can be scanned and readout.

In another embodiment one may eliminate the TFTs in FIG. 5 and directly connect MSC collectors (plate by plate) to silicon integrated circuits (tab bonded or wire bonded) used in, for example, the pocket calculator industry.

There can be some variations in the design of the micro-structured plates. These variations include, but are not necessarily limited to the following. The thin-sheet wall electrode 16 in FIG. 3 can be eliminated and the (metal) substrate 14 (together with the spacers 22) can be used directly as the wall electrode. The thin-sheet wall electrode 16 in FIG. 3 can be replaced with an insulator (e.g., the insulator board of a printed circuit) and the insulator strips in FIG. 3 can be eliminated. In this case, the spacers and the (neighboring) metal substrate are used as the wall electrodes. The microstructure shown in FIG. 3 can be formed on both sides of a substrate 14. The air or gas cavities can be replaced with ionization liquid (e.g., 2,2,4-trimethylpentane) or solid (e.g., a-Se).

The MSC collectors 18 (FIG. 3a) can be made very narrow and thin such that the electric field near the MSC collectors 18 is sufficiently high to cause gas multiplication or gas amplification. As a result, the charge signal collected by each MSC collector is linearly amplified. The orientation or shape of the spacers 22 on each plate can be rearranged or adjusted so that incident x-rays onto the gas or air cavities still have a chance to interact with the detector and, thus, the QE is further improved.

Figures 9A, 9B, 9C:
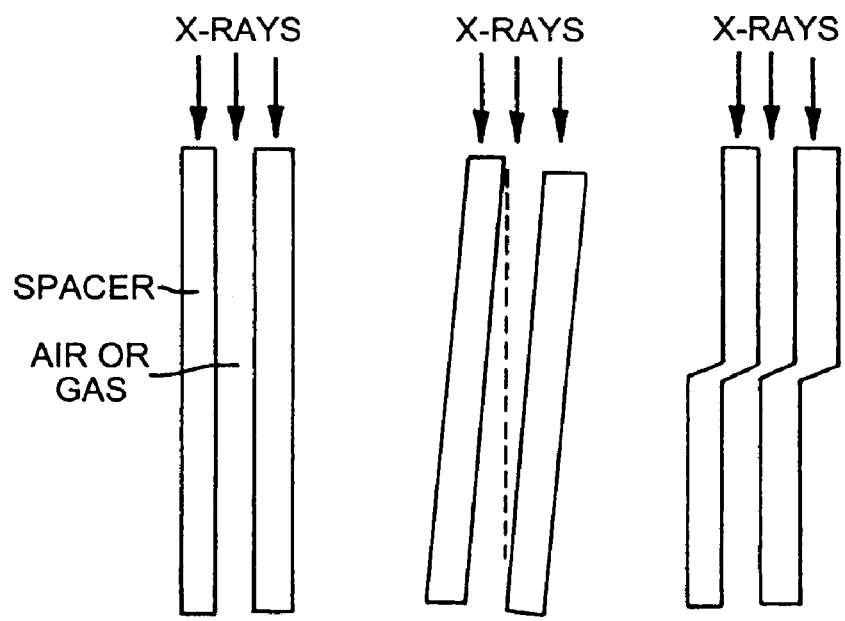
FIG. 9 shows possible variations in designing the spacers on each micro-structured plate in order to further increase the QE in which only two spacers are shown here (the MSC collector located between the spacers is not shown), the spacers are slightly out of focus towards the x-ray source in 9b) and shifted by half a pixel in the lower part of the detector in 9c), the QE for design 9b) and 9c) is higher than that for design 9a) since x-rays incident onto the gas or air cavity still have a chance to interact with the spacers in 9b) and 9c).

Referring to FIGS. 9a, 9b and 9c, different variations in designing the spacers on each micro-structured plate in order to further increase the QE are shown. Only two spacers are shown in the each of the three different combinations in FIGS. 9a to 9c (the MSC collector electrodes 18 located between the spacers are not shown). The spacers shown in FIG. 9b are slightly out of focus towards the x-ray source and the spacers shown in FIG. 9c shifted by half a pixel in the lower part of the detector. The QE for designs in FIGS. 9b and 9c is higher than that for the design of FIG. 9a since x-rays incident onto the gas or air cavity still have a chance to interact with the spacers in FIGS. 9b and 9c.

Regardless of the variation of the structure of the detector, the basic invention in its broadest form disclosed herein includes an x-ray detector comprised of a pre-selected number of micro-structured plates packed together with each micro-structured plate oriented to be parallel to the incident x-rays as shown in FIG. 2, and on each plate there must be MSC collectors 18 which are focused towards the x-ray source and collect charges generated in the ionization medium (i.e., air, gas, ionization liquid or solid) surrounded by high density materials. These collected charges represent an x-ray image and can be readout by different ways including, but not limited to, using a 2D active readout matrix that is coupled to the detector with an anisotropic conductive adhesive film or an anisotropic conductive elastomer film placed between the detector and the readout matrix as discussed with reference to FIG. 4.

Methods of Construction

Due to the requirement that MSC collectors 18 (and the spacers 22) should be focused towards the x-ray source, the micro-structured plates or detector elements in the detector are not all the same. There are, thus, two scenarios to construct the detector. One scenario is to start with identical substrates and fabricate identical micro-structured plates, and then cut these plates to the correct shapes (i.e., Method I below). The other scenario is to start with different substrates with the correct shapes and fabricate custom micro pattern for each individual plate (i.e., Method II below). Only the main steps involved in each method are listed, but it is appreciated that one skilled in the art will recognize the need for any additional steps.

Method I

Figure 7:
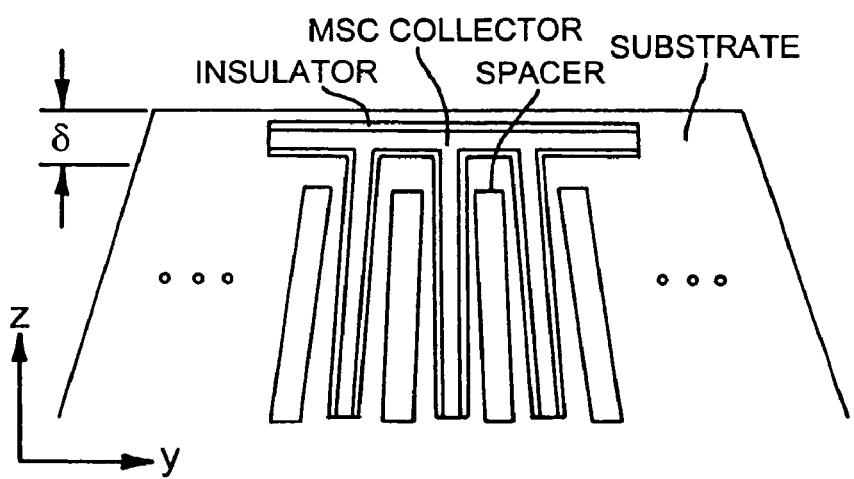
FIG. 7 shows a perspective view of a micro-structured plate with MSC collectors connected at the top (the thin sheet of wall electrode on the substrate is not shown)
Figure 8:
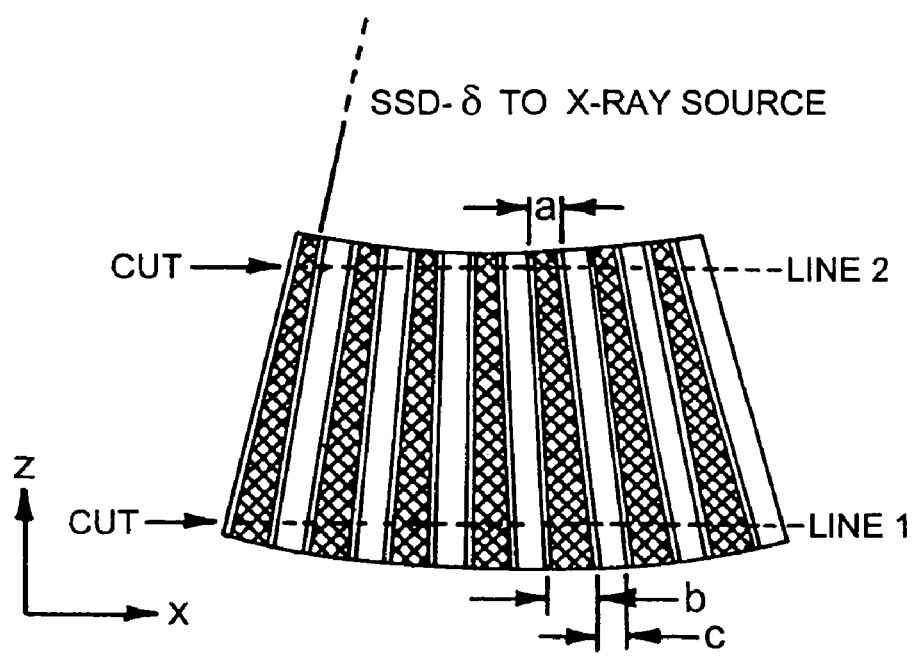
FIG. 8 shows the packing of identical micro-structured plates, which are at the same distance (SSD-δ) from the x-ray source where, c is the thickness of the spacers showing cuts along the top (line 2) and bottom (line 1) to make the detector flat.

1) A pre-selected large number of identical substrates are machined with the size of each substrate slightly larger than that required by the detector for the reason given in step (3). The thickness of the metal substrates should vary along the z direction i.e. (see FIG. 6) so that the MSC collectors can be focused towards the x-ray source (see FIG. 8).
2) Use, e.g., photolithographic and electroplating methods to fabricate identical microstructures on each substrate. The MSC collectors should be orientated in such a way that they are focused towards the x-ray source. The spacers can be electroformed with, e.g., the substrate serving as the cathode. Also all the MSC collectors are connected at the top within the distance δ from the edge (see FIG. 7) for the reason given in step (4).
3) The identical micro-structured plates are then packed together, as shown in FIG. 8. They are away from the x-ray source with the same distance, which is equal to source-to-the-detector-surface distance (SSD) minus δ. If the dimensions of the substrates have been chosen properly, the MSC collectors should be focused towards the x-ray source (the parameter c in FIG. 8 is the thickness of the spacers). Then use, e.g., conventional machining, laser machining or an electrical discharge machining method to cut (along line 1 in FIG. 8) and polish the surface of the detector, which will face the 2D active matrix.
4) In order to make a good contact between MSC collectors and the pixel electrodes of a 2D active matrix [see step (6) below], the MSC collectors are extended (see FIG. 4) by ~0.001–10.0 millimeters. This can be achieved by using, e.g., electroplating method with the collectors as the cathode.
5) Cut the top of the detector (along line 2 in FIG. 8) so that the MSC collectors are no longer connected together.
6) Connect the MSC collectors 18 to a 2D active matrix using, e.g., an anisotropic conductive film as shown in FIG. 4.

Method II

1) Machining of a large number of identical metal substrates as in Method I above.
2) Packing of the substrates and cutting in the same way as shown in FIG. 8 except there are no microstructures but only spacers (with the same thickness as in the microstructures) placed between substrates. Cut the top (along line 2 in FIG. 8) as well as the bottom (along line 1 in FIG. 8) to make the detector flat. Each substrate should be numbered based on its location.
3) Fabrication of custom microstructure for each individual plate using different masks or by repositioning the same mask using for example photolithographic and electroplating methods to fabricate microstructures on each substrate (which has been cut in advance). The MSC collectors on all plates should be focused towards the x-ray source. This can be achieved by using different masks or by repositioning the same large mask, depending on the location of an individual plate. Also, step (4) in method I is not necessary here since the metal sheet used for MSC collectors during photolithography can be made a little bigger than the substrate (the edge of the substrate can be coated with insulator as well).
4) packing of the micro-structured plates: re-pack the substrates with microstructures according to their locations in step (2). Use precision alignment at the surface facing a 2D active matrix (see step 5).
5) Connecting to a 2D active matrix: Same as in method I.

Utility

The following lists several applications for the x-ray detector of the present invention.

(1) Treatment Verification in Radiation Therapy

The goal of radiation therapy, used today to treat patients with tumors, is to accurately deliver a prescribed radiation dose to the diseased tissues and yet spare the uninvolved surrounding healthy tissues. Both the geometric and the dosimetric accuracy of radiation therapy treatments are crucial for their success. Currently, there are two ways to take an X-ray image of the patient (known as portal imaging) with the treatment beam (usually megavoltage x-rays) during, or immediately before, the treatment to verify the positional accuracy of treatment beams. One is based on film; the other is based on EPIDs. Film is awkward to use since film has to be developed before the patient's position can be checked. EPIDs have rapid readout capabilities but most of these currently in use have poor image quality. Although recently developed flat panel detectors have been proven to have a much better image quality than conventional EPIDs, they are still non-efficient in utilizing x-rays due to its low QE. The detector of the present invention is much more efficient at using radiation and can be used to replace films or any previous developed EPID for treatment verification.

(2) Real-time Target Tracking in Radiation Therapy

In conventional radiation therapy treatments, the position of a radiation beam is fixed (i.e., static) relative to the patient's bony structure. In some cases, such as the lung, however, the tumor is a moving target due to patient breathing. Currently, the radiation beam has to target an area significantly larger than the tumor size in order to cover the moving target, resulting in unnecessary irradiation of uninvolved surrounding healthy tissues. In order to solve this problem, a megavoltage fluoroscopic imaging system that can be used to track target motion in real time during radiation therapy is needed. (The dynamic information from the imaging system can then be used to control the radiation beam to follow the moving target in real time). For a fluoroscopic imaging system, a high efficiency at using radiation is required. The present invention will, thus, be especially useful in this application.

(3) Transit Dosimetry in Radiation Therapy

There are two types of treatment verification in radiation therapy: geometric and dosimetric. The first concerns treatment setup and the second the delivered dose. Currently, there is a lack of convenient tools to verify (on-line) the dose delivered to the patient during radiation therapy treatments. EPIDs are potential tools for this application. To accomplish the dosimetric verification, an EPID detector would be in place during treatment and acquire treatment images. Once the treatment is completed, delivered iso-dose lines would be displayed and superimposed on the patient anatomy within a few seconds, which would then be compared to the calculated iso-dose lines based on the planning system. The present invention can be used for this application as well.

(4) Machine Quality Assurance in Radiation Therapy

Linear accelerators that generate radiation for patient treatments require routine quality-assurance checks. Currently, there are various tools being used in clinic for this purpose. EPIDs are potential tools that can be conveniently used for a quick check on, e.g., machine output and beam profiles. To accomplish this, flat field images (i.e. no patient or object between the detector and the x-ray source of the machine) would be taken. The digital values of these images will be compared to the standard data (that are pre-set for the machine) to see if there is any abnormal deviation. The present invention can be used for this application as well.

(5) Soft-tissue Imaging Using Treatment Beam in Radiation Therapy (Megavoltage Cone Beam CT)

The challenge in megavoltage x-ray imaging in radiation therapy is soft-tissue imaging. MVCT using a flat panel imager is a promising technique for soft tissue imaging. To accomplish this, a patient or an object is placed on a table around the isocenter of a linear accelerator, which is about half way between the x-ray source and a flat panel detector. The detector and the megavoltage x-ray source are then rotated simultaneously around the patient (by rotating the gantry), and a set of images is taken at different gantry angles, which leads to a set of CT images after reconstruction. However, with current flat panel systems, the dose required to achieve sufficient soft tissue contrast for, e.g., the prostate is prohibitively high due to its low QE. The present invention can, thus, provide a solution to this problem.

(5) Other Applications

The present invention can be applied to any high-energy x-ray imaging that requires a high efficiency at using radiation.

As used herein, the terms "comprises", "comprising", "includes" and "including" are to be construed as being inclusive and open ended, and not exclusive. Specifically, when used in this specification including claims, the terms "comprises", "comprising", "includes" and "including" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

The invention claimed is:

1. A process for producing a stack of one or more detector elements aligned together in an x-ray detector, wherein said detector element includes an electrically conductive plate substrate with a first planar surface and an upper edge and a lower edge, at least two electrically conductive elongate strip electrodes spaced from each other, each electrically conductive elongate strip electrode being mounted on an insulator interposed between the electrically conductive elongate strip electrode and the first planar surface of the electrically conductive plate substrate, and wherein each detector element is positioned in the stack in such a way that each detector element is aligned in the direction of the flux of x-rays incident on each detector element when the x-ray detector is in use, comprising the steps of:

machining a pre-selected number of substantially identical tapered electrically conductive plate substrates with the size of each substrate larger than that required by the detector;

fabricating on the first planar surface of each tapered electrically conductive plate substrate a substantially identical microstructure comprising the at least two electrically conductive elongate strip electrodes, the insulator interposed between each electrically conductive elongate strip electrodes and the first planar surface, and spacers mounted on the first planar surface of each electrically conductive plate substrate for preventing the electrically conductive elongate strip electrodes on one electrically conductive plate substrate from electrically contacting an electrically conductive plate substrate in an adjacent detector element;

packing and bonding together the tapered electrically conductive plate substrates to form a fan-shaped pre-stack structure, and machining the fan-shaped pre-stack structure to produce the stack having a flat top surface and a flat bottom surface, wherein the top surface of the stack faces the x-ray source when assembled with the x-ray source.

2. The process according to claim 1 wherein the substantially identical microstructures on each electrically conductive plate substrate are produced using photolithographic processing.

3. The process according to claim 1 wherein the substantially identical microstructures on each electrically conductive plate substrate are produced using electroplating.

4. A process for producing a stack of one or more detector elements aligned together in an x-ray detector, wherein said detector element includes an electrically conductive plate substrate with a first planar surface and an upper edge and a lower edge, at least two electrically conductive elongate strip electrodes spaced from each other, each electrically conductive elongate strip electrode being mounted on an insulator interposed between the electrically conductive elongate strip electrode and the first planar surface of the electrically conductive plate substrate, and wherein each detector element is positioned in the stack in such a way that each detector element is aligned in the direction of the flux of x-rays incident on each detector element when the x-ray detector is in use, comprising the steps of:

machining a pre-selected number of substantially identical tapered electrically conductive plate substrates with the size of each substrate larger than that required by the detector;

packing together the tapered electrically conductive plate substrates to form a fan-shaped pre-stack structure, and machining the fan-shaped pre-stack structure to produce the stack having a flat top surface and a flat bottom surface, wherein the top surface of the stack faces the x-ray source when assembled with the x-ray source;

disassembling the stack and applying a different portion of an oversized mask with a pre-selected pattern to the first surface of each tapered electrically conductive plate substrate and with the mask in place and fabricating on the first planar surface of each tapered electrically conductive plate substrate a substantially identical microstructure comprising the at least two electrically conductive elongate strip electrodes, the insulator interposed between each electrically conductive elongate strip electrodes and the first planar surface, and spacers mounted on the first planar surface of each electrically conductive plate substrate for preventing the electrically conductive elongate strip electrodes on one electrically conductive plate substrate from electrically contacting an electrically conductive plate substrate in an adjacent detector element;

repacking the tapered electrically conductive plate substrates in their pre-selected locations in the stack and bonding them together, whereby the step of applying the different portion of the oversized mask with a pre-selected pattern to the first surface of the different tapered electrically conductive plate substrates ensures the conductive elongate strip spacers and the at least two electrically conductive elongate strip electrodes on each of the tapered electrically conductive plate substrates are aligned in the direction of the flux of x-rays incident on that given detector element.

5. The process according to claim 4 wherein the substantially identical microstructures on each electrically conductive plate substrate are produced using photolithographic processing.

6. The process according to claim 4 wherein the substantially identical microstructures on each electrically conductive plate substrate are produced using electroplating.

* * * * *